June 21, 1949.    J. C. CARLIN ET AL    2,473,784
INNER TUBE AND METHOD OF MAKING THE SAME
Filed Nov. 9, 1944    3 Sheets-Sheet 1

Inventor:
JAMES C. CARLIN
ROBERT R. LLOYD
By
Attorney.

June 21, 1949.   J. C. CARLIN ET AL   2,473,784
INNER TUBE AND METHOD OF MAKING THE SAME
Filed Nov. 9, 1944   3 Sheets-Sheet 2
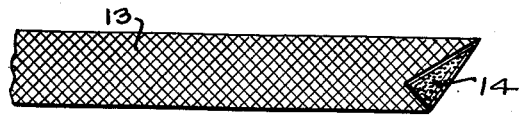
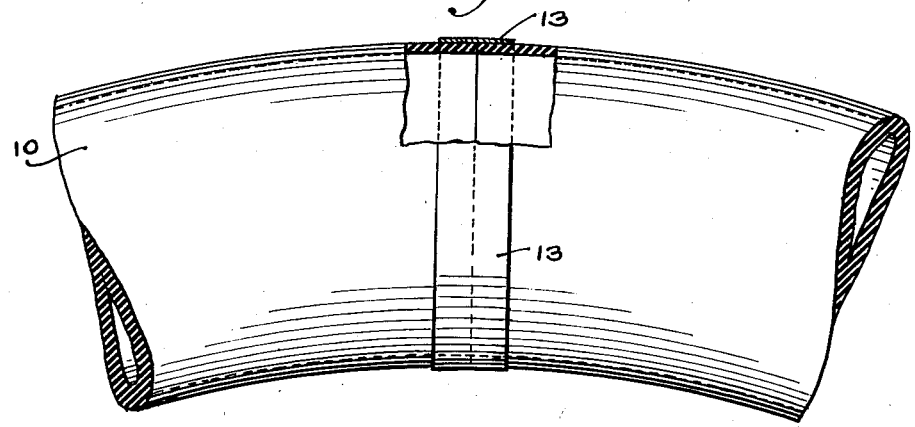
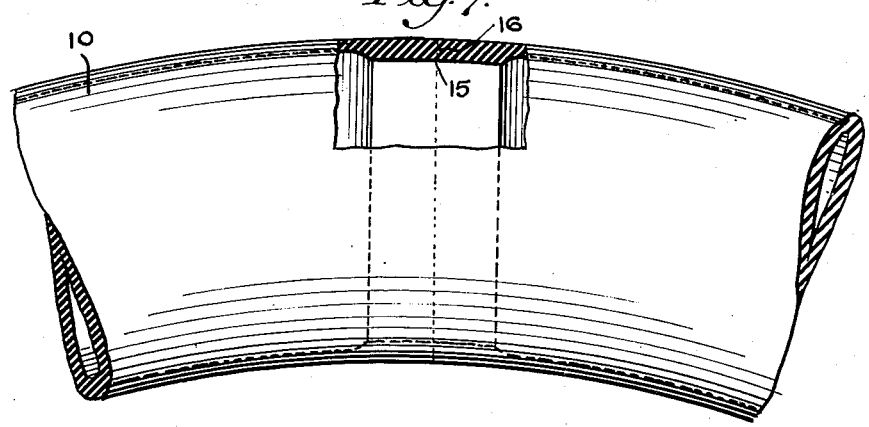
Inventor:
JAMES C. CARLIN
ROBERT R. LLOYD
By Leo Eckelson
Attorney.

Inventors:
JAMES C. CARLIN
ROBERT R. LLOYD

Patented June 21, 1949

2,473,784

UNITED STATES PATENT OFFICE 2,473,784

INNER TUBE AND METHOD OF MAKING THE SAME

James C. Carlin and Robert R. Lloyd, Norristown, Pa., assignors to Lee Rubber & Tire Corporation, Conshohocken, Pa., a corporation of New York Application November 9, 1944, Serial No. 562,730

1 Claim. (Cl. 154—14)

This invention relates generally to hollow articles made of synthetic rubber and more particularly to an improved construction of synthetic rubber inner tube for pneumatic tires and to the method of splicing such tubes and other such annular inflatable articles of manufacture.

Heretofore and prior to the present invention, in the manufacture of such synthetic rubber articles as inner tubes employed as air containers within pneumatic tires, considerable difficulty has been encountered in obtaining a satisfactory splice between the ends of the tubular stock of which the tube is formed.

Two methods of splicing are generally employed in the manufacture of pneumatic inner tubes. According to one method, the ends of the tubular stock of which the tube is formed are complementally skived to feather edges, after which the skived portions are buffed and coated with a suitable adhesive and then brought into overlapping relation to form a joint, this method resulting in what is conventionally known as a lapped splice. According to the other method, the opposite ends of the tubular stock are cut by means of a suitable cutting device, usually a hot knife, and the freshly severed ends are then closely pressed together into abutting relation, the abutting ends being so held together until adhesion takes place between the freshly severed ends to produce what is now conventionally known as a butt splice. In both cases, after the tube ends have been preliminarily joined together, the tube is placed in a curing mold wherein it is vulcanized to produce a permanent, integral union between the spliced parts.

At the present time, pneumatic inner tubes and like articles are being made practically exclusively of synthetic rubber, of which two types are generally employed, one being of a composition now generally known and designated by the term "GR-S" and the other of a composition generally known and designated by the term "GR-I." These terms "GR-S" and "GR-I" are Government-designated terms for respectively identifying synthetic rubber of butadiene-styrene copolymer composition and synthetic rubber of isoprene-isobutylene copolymer composition. The paramount difficulty with both the GR-S and GR-I synthetic rubber compositions is that they lack adhesiveness of the order necessary to securely hold the spliced ends together while in the curing mold so as to obtain a satisfactory butt weld, while in the case of the GR-I composition, it is so impervious to gasses that upon the generation of any gas between the spliced surfaces of the tube, as frequently occurs during the curing process to which the tube is subjected, objectionable blisters form within the splice because of the inability of the gas to escape from between the spliced portions of the tube. Moreover, the gas so confined between the spliced surfaces of the tube interferes with proper adhesion of the surfaces to be joined together with the result that defective splices frequently occur. This blistering effect is especially pronounced in the case of GR-I tubes formed with lapped splices.

Also, because both the GR-I and the GR-S synthetic rubber compositions are slow curing as compared with natural rubber, the extra thickness of the overlap in the case of a lapped splice necessitates such a prolonged curing time as to render lapped splices in tubes made of such synthetic rubber compositions economically unsatisfactory.

We have found that all of the aforementioned difficulties may be obviated by employing in conjunction with the butt splice method of forming pneumatic tubes a binding tape or band which is specially treated to render it capable of only temporary adherence to the particular synthetic rubber of which the tube is formed and which is adapted, when wrapped about the splice, to firmly and securely hold together the abutting edges thereof in adhering contact when the tube is inflated preparatory to and during the curing process, the tape or band being subsequently stripped from the tube upon its removal from the curing mold.

Accordingly, it is among the principal objects of the present invention to provide a method of butt splicing tubes formed of synthetic rubber wherein a binding tape or band is employed which is of such character that it functions to hold the abutting edges of the tube together so effectively during the curing operation that upon completion of the cure, the said edges will have been integrally and permanently secured together throughout their entire circumferential extent, the tape being so incompatible with the particular synthetic rubber composition of which the tube is formed as to permit of its being readily stripped from the tube upon removal thereof from the curing mold.

A further object of the present invention is to provide a pneumatic tube formed of synthetic rubber having a butt-splice which is comparable in all material respects with the butt-splice of a tube formed of natural rubber, as well as to provide the means for and method of producing such butt-splice without appreciably increasing the cost of the tube or necessitating the use of any special tools or equipment or alterations in the curing molds.

Other objects and advantages of the present invention will appear more fully hereinafter, it being understood that the said invention consists substantially in the combination, arrangement, location and relative arrangement of the parts, as well as in the procedure by which the same are employed, as will be described herein, as shown in the drawings and as finally pointed out in the appended claim.

In the said accompanying drawings:

Figure 5 is a view of the binding tape or band which is employed in accordance with the present invention;

Figure 6 is a view similar to Figure 1 but showing the severed ends of the tube in abutting relation and wrapped with the binding tape preparatory to vulcanization of the tube splice in the curing mold;

Figure 7 is an elevational view of the vulcanized tube with the binding tape stripped therefrom, the vulcanized splice being shown partially in section;

Figure 1:
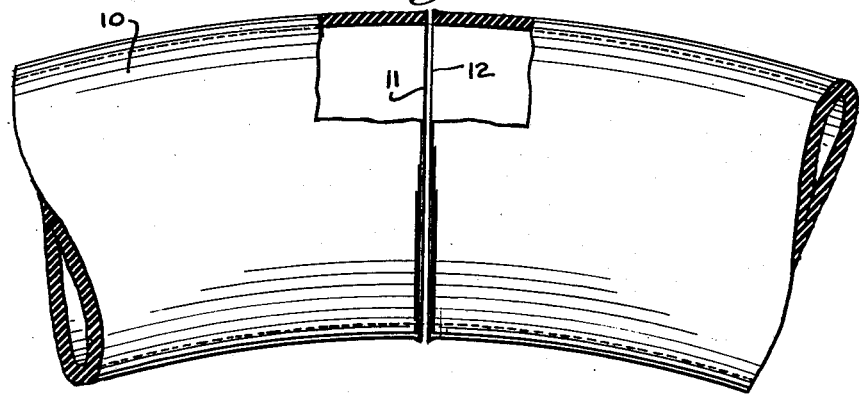
Figure 1 is an elevational view, partially in section, of a portion of an expanded tube with its severed ends shown in separated relation.
Figure 2:
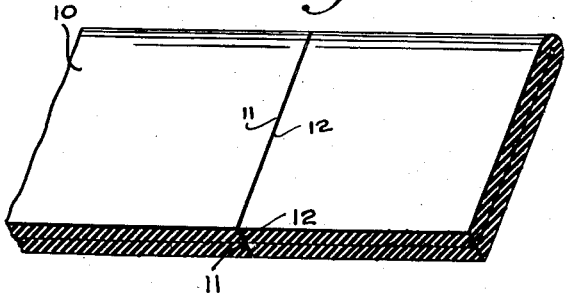
Figure 2 is a perspective view of a portion of the tube shown flattened and with its severed ends in abutting relation.
Figure 3:
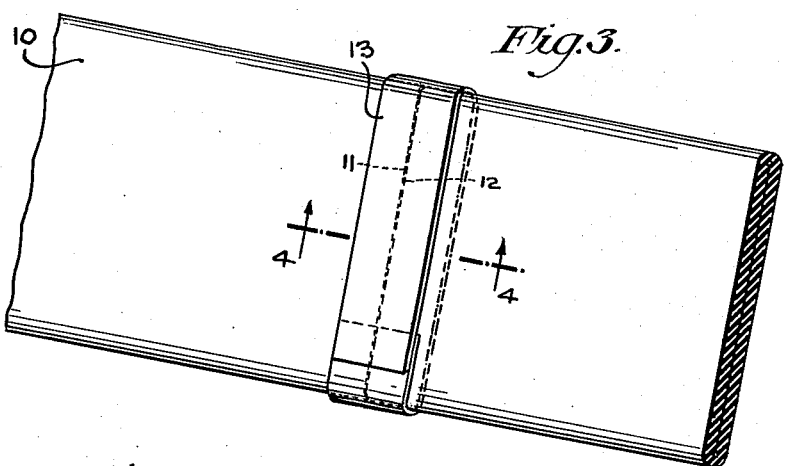
Figure 3 is a perspective view of the flattened tube showing the binding tape or band wrapped about the abutting edges of the tube.
Figure 4:
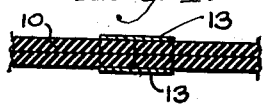
Figure 4 is a sectional view taken on the line 4—4 of Figure 3.

Referring now more particularly to the drawings, it will be observed that the tube 10, which is formed of either GR-S or GR-I synthetic rubber, is initially prepared in accordance with conventional practice followed in the making of butt-splice joints by severing the tube stock to provide a pair of square cut edges 11 and 12 which are adapted to be brought into abutting relation as best shown in Figures 2, 3 and 4. As has been previously pointed out, due to the fact that both the GR-S and GR-I synthetic rubber compositions lack in themselves the adhesiveness necessary to securely hold the freshly severed edges 11 and 12 together, it is difficult, if not impossible, to maintain said edges in contacting relation throughout their circumferential extents while the tube is inflated preparatory to and during curing of the tube, particularly in view of the fact that such process requires the tube to be inflated to a pressure which, while of low order, nevertheless tends to and frequently does pull the abutting edges of the tube apart before the same are effectively and integrally united by the vulcanizing process.

In order to overcome this difficulty, we employ a fabric tape or band 13 which is adapted to be wrapped about the tube splice in the manner best shown in Figures 3 and 4 to hold the freshly severed ends 11 and 12 thereof in abutting contact with each other. This tape or band 13 is specially prepared in the form of a bias cut narrow strip of fabric, one surface of which is coated, as at 14, with an adhesive which is suitable for use with the particular synthetic rubber composition of which the tube may be formed.

Thus, in the case of the tape or band designed for use with a tube formed of GR-S synthetic rubber, the friction coating 14 thereof is of GR-I synthetic rubber because the latter is not compatible with GR-S rubber and the tape therefore does not become integrally bonded to the tube when the latter is cured in the vulcanizing mold. In applying this tape so friction coated with GR-I rubber, the surface of the GR-S tube in the immediate region of the splice is initially coated with an application of natural rubber cement which has a vulcanizing affinity for the GR-S rubber of the tube, but not for the GR-I friction coating of the tape. The rubber cement, however, provides a tacky surface to which the GR-I friction coating of the tape 14 adheres sufficiently to maintain it in place when wrapped about the splice, the tape thus serving to hold the severed ends of the tube stock together preliminarily to and during the vulcanization of the tube. Upon removal of the tube from the curing mold following vulcanization of the splice, the tape is stripped from the tube, the resultant tube splice being then of the form shown in Figure 7 with the severed ends of the tube integrally united, as at 15. The tape 14, of course, is readily stripped from the tube by reason of the fact that the friction coating thereof has no vulcanizing affinity for the tube stock or for the natural rubber cement which was applied to the surface of the tube for adhesively securing the tape in place. Inasmuch as this rubber cement does itself have a vulcanizing affinity for the GR-S rubber of the tube, it becomes bonded to the latter as an integral part thereof during the curing process.

In the case of a tube formed of GR-I synthetic rubber, a binding tape or band 13 is employed having a friction coating 14 of crude or natural rubber. In order to adhesively secure such tape to the tube when it is wrapped about the splice as shown in Figures 3 and 4, the surface of the tube throughout the region of the splice is rendered suitably tacky by the application thereto of a GR-I synthetic rubber cement or of a suitable solvent therefor, such as gasolene. The spliced tube, with the binding tape applied thereto as described, is then placed in the curing mold for vulcanization of the splice. Upon removal of the vulcanized tube from the mold, the tape is readily stripped therefrom by reason of the fact that its friction coating of crude or natural rubber, having no vulcanizing affinity for the GR-I rubber of the tube, is not permanently bonded or united thereto.

It will be observed that the binding tape or band 13 is formed of a woven fabric which is bias cut to provide it with a capacity for lengthwise stretch to thereby enable it to extend with the tube as the latter is inflated preparatory to placing it in the curing mold. As the tape is circumferentially extended upon inflation of the tube about which it is wrapped, the tape is correspondingly contracted in its width in consequence of which it tends to draw or force the edges of the splice into such close contacting engagement as to insure the formation of a splice which is uniformly good throughout its circumferential extent. Actually, this tendency of the binding tape to contract widthwise upon its being longitudinally stretched so compresses the tube stock within the region thereof which is embraced by the tape that upon subsequent curing of the tube, its wall thickness, in the immediate region of the splice and to either side of the central line thereof, is materially increased, as is indicated by the reference numeral 16 in Figure 7. Due to the fact that the external surface of the tube is pressed into engagement with and so conforms to the contour of the internal walls of the curing mold, the extra thickness 16 formed in the region of the splice is disposed internally of the tube in the form of a relatively broad annular rib within which is included the tube splice. Thus, although from all outward appearances the tube splice of the present invention would appear to be of conventional construction, it is actually of substantially greater body and therefore stronger than the conventional splice.

It will be apparent from the foregoing that in the practice of the present invention no special equipment or apparatus other than ordinarily employed in the manufacture of butt-spliced tubes is required. The departure from conventional practice is in the application of the binding tape which is wrapped about the splice of the tube prior to its inflation and insertion in the curing mold, the tape being removably cemented in place as hereinbefore described. Preferably, the opposite ends of the applied tape are overlapped (see Figure 3) to insure that the splice is adequately covered throughout its entire extent.

In certain constructions of the inner tube, especially in the larger sizes thereof, it is desirable to limit the application of the friction-coated tape 13 to that portion of the splice which extends circumferentially about the crown of the inflated tube. In such cases, the tape extends somewhat more than half way around the tube splice, the remaining portion of the splice being covered by a strip 17 of rubber having a vulcanizing affinity for the particular rubber composition of which the tube is principally formed.

Figure 8:
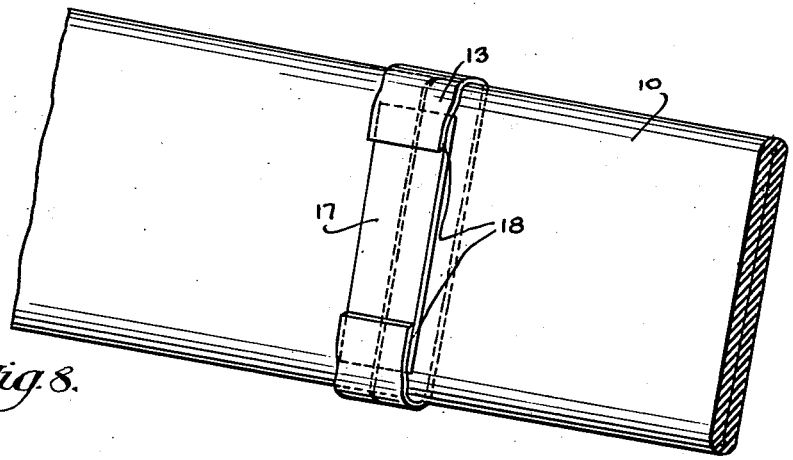
Figure 8 is a perspective view showing a modified application of the binding tape to the tube.
Figure 9:
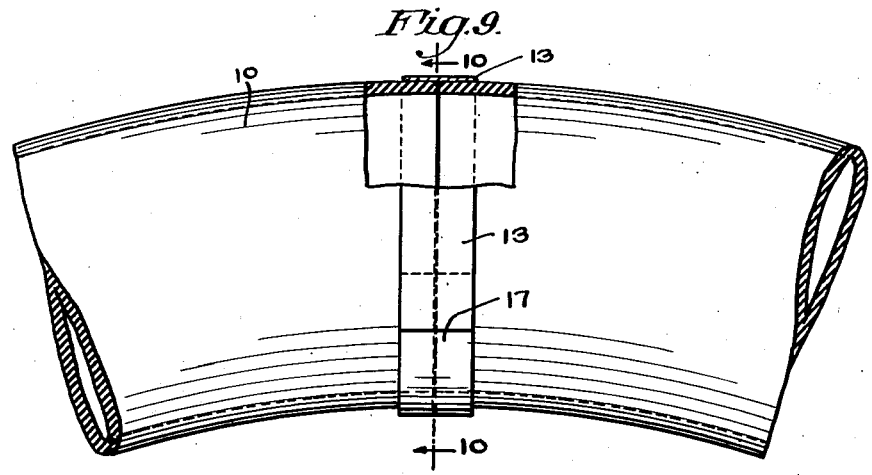
Figure 9 is an elevational view showing a portion of the tube, treated as shown in Figure 8, inflated preparatory to the curing operation.
Figure 10:
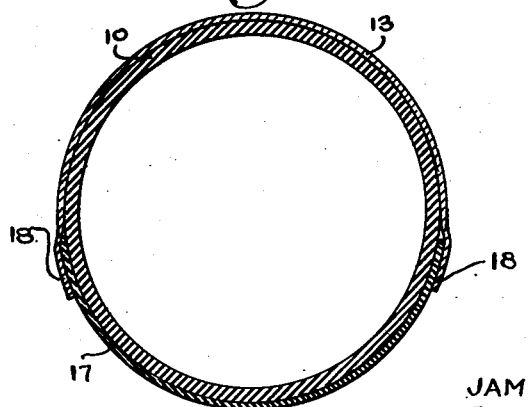
Figure 10 is a transverse section of the inflated tube taken on the line 10—10 of Figure 9.

As most clearly appears in Figures 8, 9 and 10, the auxiliary strip 17 of rubber, which becomes permanently bonded or united to the tube upon vulcanization thereof, is disposed about the inner half of the circumferential splice, while the friction-coated tape 13, which may be stripped from the tube following curing thereof, is disposed about the outer half of the splice. The opposite ends of the tape 13 overlap the proximate ends of the auxiliary rubber strip 17, as at 18, to insure that the splice is completely covered throughout its circumferential extent.

Of course, in applying the friction-coated tape 13 about the tube as illustrated in Figures 8, 9 and 10, exactly the same procedure is followed as described in the case where the tube splice is completely wrapped with the friction tape, the adhesive coating of the latter being of such composition as has no vulcanizing affinity for the particular rubber of which the tube is formed. However, insofar as concerns the auxiliary rubber strip 17, it is of a composition which has an affinity for the tube stock, because such strip is intended to become integrally bonded to the tube about the inner half of the tube splice. Thus, in the case of a tube formed of GR-I synthetic rubber, the rubber strip 17 is also formed of GR-I rubber, while in the case of a tube formed of GR-S synthetic rubber, the strip 17 is formed of either natural rubber or GR-S synthetic rubber, both of which have a vulcanizing affinity for the GR-S synthetic rubber.

What is claimed as new and useful is:

In a method of splicing a pneumatic rubber tube which consists in complementally severing the opposite ends thereof while in an uncured state to provide the same with freshly exposed surfaces, in joining together the severed ends of the tube with the exposed surfaces thereof in contacting relation, in applying about a substantial extent of the tube joint a circumferentially extending fabric tape having its inner surface treated with a material which is non-vulcanizably adherent to the rubber stock of the tube, said tape being bias cut to provide it with a capacity for lengthwise stretch, in inflating the tube preliminarily to curing of the same in a curing mold, and in then curing the inflated tube, said tape being so contracted in width upon the inflation of the tube and the corresponding lengthwise stretch of the tape as to draw the tape-covered portions of the tube stock together with a resulting increase in thickness of said portions.

JAMES C. CARLIN.
ROBERT R. LLOYD.

REFERENCES CITED

The following references are of record in the file of this patent:

UNITED STATES PATENTS

| Number | Name | Date |
| --- | --- | --- |
| Re. 12,671 | Marks | July 9, 1907 |
| 528,056 | Woodward | Oct. 23, 1894 |
| 1,310,436 | Roberts | July 22, 1919 |
| 1,310,438 | Roberts | July 22, 1919 |
| 1,459,401 | Hottel | June 19, 1923 |
| 1,612,575 | Goldthread | Dec. 28, 1926 |
| 1,638,659 | Fairchild | Aug. 9, 1927 |
| 2,430,630 | Davis | Nov. 11, 1947 |

FOREIGN PATENTS

| Number | Country | Date |
| --- | --- | --- |
| 20,617 | Great Britain | Sept. 10, 1912 |